US009854517B2

(12) United States Patent
Cuervo Laffaye et al.

(10) Patent No.: US 9,854,517 B2
(45) Date of Patent: Dec. 26, 2017

(54) SCHEDULING DATA IN BACKGROUND SERVICES ON MOBILE DEVICES (71) Applicant: HEWLETT-PACKARD DEVELOPMENT COMPANY, L.P., Houston, TX (US)

(72) Inventors: Eduardo Alberto Cuervo Laffaye, Palo Alto, CA (US); Kyu Han Kim, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 63 days.

(21) Appl. No.: 14/763,751

(22) PCT Filed: Jan. 31, 2013

(86) PCT No.: PCT/US2013/024005
§ 371 (c)(1),
(2) Date: Jul. 27, 2015

(87) PCT Pub. No.: WO2014/120173
PCT Pub. Date: Aug. 7, 2014

(65) Prior Publication Data
US 2016/0007282 A1    Jan. 7, 2016

(51) Int. Cl.
*G08C 17/00* (2006.01)
*H04W 52/02* (2009.01)
(Continued)

(52) U.S. Cl.
CPC ...... *H04W 52/0212* (2013.01); *G06F 1/3209* (2013.01); *G06F 1/3296* (2013.01); *H04L 67/22* (2013.01); *H04L 67/2833* (2013.01); *H04L 67/32* (2013.01); *H04W 4/18* (2013.01); *H04W 28/02* (2013.01); *H04W 52/0225* (2013.01); *H04W 52/0248* (2013.01);
(Continued)

(58) Field of Classification Search
None
See application file for complete search history.

(56) References Cited

U.S. PATENT DOCUMENTS 9,154,550 B1 * 10/2015 Abgrall ............... H04L 67/1002
2009/0043865 A1 * 2/2009 Dumitru ................ H04L 51/38
709/217

(Continued)

FOREIGN PATENT DOCUMENTS

EP        2346288 A1    7/2011
JP    2008-301106 A    12/2008

OTHER PUBLICATIONS

Deng, S. et al, "Traffic-Aware Techniques to Reduce 3G/LTE Wireless Energy Consumption", Dec. 10-13, 2012.

*Primary Examiner* — Edan Orgad
*Assistant Examiner* — Rebecca Song
(74) *Attorney, Agent, or Firm* — Trenner Law Firm (57) ABSTRACT

Systems and methods of scheduling data in background services on mobile devices are disclosed. An example method includes identifying data consumption patterns on a mobile device. The method also includes determining sensitivity of data arriving at the mobile device based on the data consumption patterns. The method also includes aggregating network access by background services on the mobile device according to a schedule based on the sensitivity of the data arriving at the mobile device.

18 Claims, 10 Drawing Sheets

(51) Int. Cl.
*H04W 28/02* (2009.01)
*H04L 29/08* (2006.01)
*H04W 4/18* (2009.01)
*G06F 1/32* (2006.01)
*H04W 4/00* (2009.01)
*H04L 12/851* (2013.01)
*H04W 88/18* (2009.01)

(52) U.S. Cl.
CPC ............ *H04L 47/24* (2013.01); *H04W 4/006* (2013.01); *H04W 88/182* (2013.01); *Y02B 60/1285* (2013.01); *Y02B 60/50* (2013.01)

(56) References Cited

U.S. PATENT DOCUMENTS

| | | | |
|---|---|---|---|
| 2010/0094878 A1* | 4/2010 | Soroca | G06F 17/30035 707/748 |
| 2010/0322187 A1* | 12/2010 | Tani | H04L 1/0007 370/331 |
| 2011/0134110 A1 | 6/2011 | Song et al. | |
| 2012/0023190 A1 | 1/2012 | Backholm et al. | |
| 2012/0155348 A1 | 6/2012 | Jacobson | |
| 2012/0158908 A1 | 6/2012 | Luna et al. | |
| 2012/0163232 A1 | 6/2012 | Yoo | |
| 2012/0275367 A1 | 11/2012 | Ludwig et al. | |
| 2012/0287831 A1 | 11/2012 | Cheng et al. | |
| 2012/0322387 A1 | 12/2012 | Nicoara et al. | |
| 2014/0130154 A1* | 5/2014 | Dolby | G06F 21/577 726/22 |
| 2016/0004410 A1* | 1/2016 | Srinivasan | G06Q 50/01 715/765 |
| 2016/0188181 A1* | 6/2016 | Smith | G06F 3/048 715/765 |

* cited by examiner

SCHEDULING DATA IN BACKGROUND SERVICES ON MOBILE DEVICES

BACKGROUND

Mobile device usage continues to increase. In 2011, for example, mobile device traffic accounted for almost 7 percent of the total network traffic in the United States. Some of the biggest challenges facing mobile device users are imposed by energy constraints.

Energy constraints in mobile devices include, but are not limited to, slow improvements in battery capacity in view of the increasing power demands of modern mobile devices. For example, improvements in electronics (e.g., larger screens, increased number of sensors) and the processing power to execute more sophisticated software applications, account for some of the increased energy consumption by mobile devices. Data communications also contributes to the increased energy consumption by mobile devices. While just 10 years ago, mobile phones could last several days on a single battery charge, now it is common for users to have to recharge the battery in their mobile devices at least once a day, and often even more frequently. It is expected that battery capacity will struggle to keep up with energy consumption in mobile devices.

DETAILED DESCRIPTION

Data usage consumes a significant amount of energy in mobile devices, and impacts battery recharge cycles. A portion of the energy used by mobile devices is not used for the actual transfer of data, but rather is consumed before and/or after the data transfer occurs. For example, mobile devices may incur a "ramp cost" (consuming energy prior to commencement of a data transfer) while associating with a wireless access point (WAP) to establish a wireless local area network or "WiFi" connection. Likewise, mobile devices may incur a "tail cost" (e.g., by continuing to power the communications radio and thus consuming "tail energy") by remaining in a high power state even after a data transfer is completed. In addition, mobile applications or "apps" may continue to access data services in the background. For example, apps may enable social network updates, deploy software updates, and fetch e-mail, even when the user is not actively using the mobile device.

Example systems and methods of scheduling data in background services on mobile devices are disclosed. In an example, data consumption patterns are identified on a mobile device. Sensitivity of data arriving at the mobile device is determined based on the data consumption patterns. A schedule is used to aggregate network access by background services on the mobile device based on the sensitivity of the data arriving at the mobile device.

The systems and methods described herein can be used to reduce power consumption associated with data traffic by determining tolerance of a user to delaying some data, and then intercepting and aggregating data traffic in background services. Aggregation may be based on the user's tolerance for delayed data. Delay-tolerant data can be aggregated, while more sensitive data can be immediately pushed. In an example, data consumed by the mobile device may be more delay-tolerant than data consumed by a user. Other examples are also contemplated. In addition, analysis of incoming traffic can be used to pre-fetch associated data and bundle the pre-fetched data with the delay-tolerant data to further reduce energy consumption associated with data use.

Traffic classification, including simple approaches such as port-based classification, may be used to attempt to infer the application type, and in consequence the behavior, to reduce background data use. But these approaches can be inaccurate, causing user frustration when data the user is expecting does not arrive on the mobile device in a timely manner. Likewise, misclassification can give higher priority than desired, resulting in wasted power. More sophisticated approaches, such as payload based classification may also be used, relying on packet data to reconstruct application information, in addition to basic semantics of transport protocol and port usage. But payload inspection can add significant overhead by increasing complexity of the identification process.

The systems and methods described are not restricted to using protocol information, information payload, or statistical inference of traffic properties. Instead, the systems and methods are based on information flow through the mobile device itself. Nevertheless, the systems and methods described herein may be utilized independently or be orthogonally applied to other approaches to further reduce power consumption (e.g., ramp and tail costs) associated with data usage in mobile devices. In addition, data transfers can be deferred until a more power efficient radio is available if the priority allows to. For example, low priority traffic can be downloaded only when on a Wi-Fi connection which is more power efficient than 3G.

Before continuing, it is noted that as used herein, the terms "includes" and "including" mean, but are not limited to, "includes" or "including" and "includes at least" or "including at least." The term "based on" means "based on" and "based at least in part on."

Figure 1:
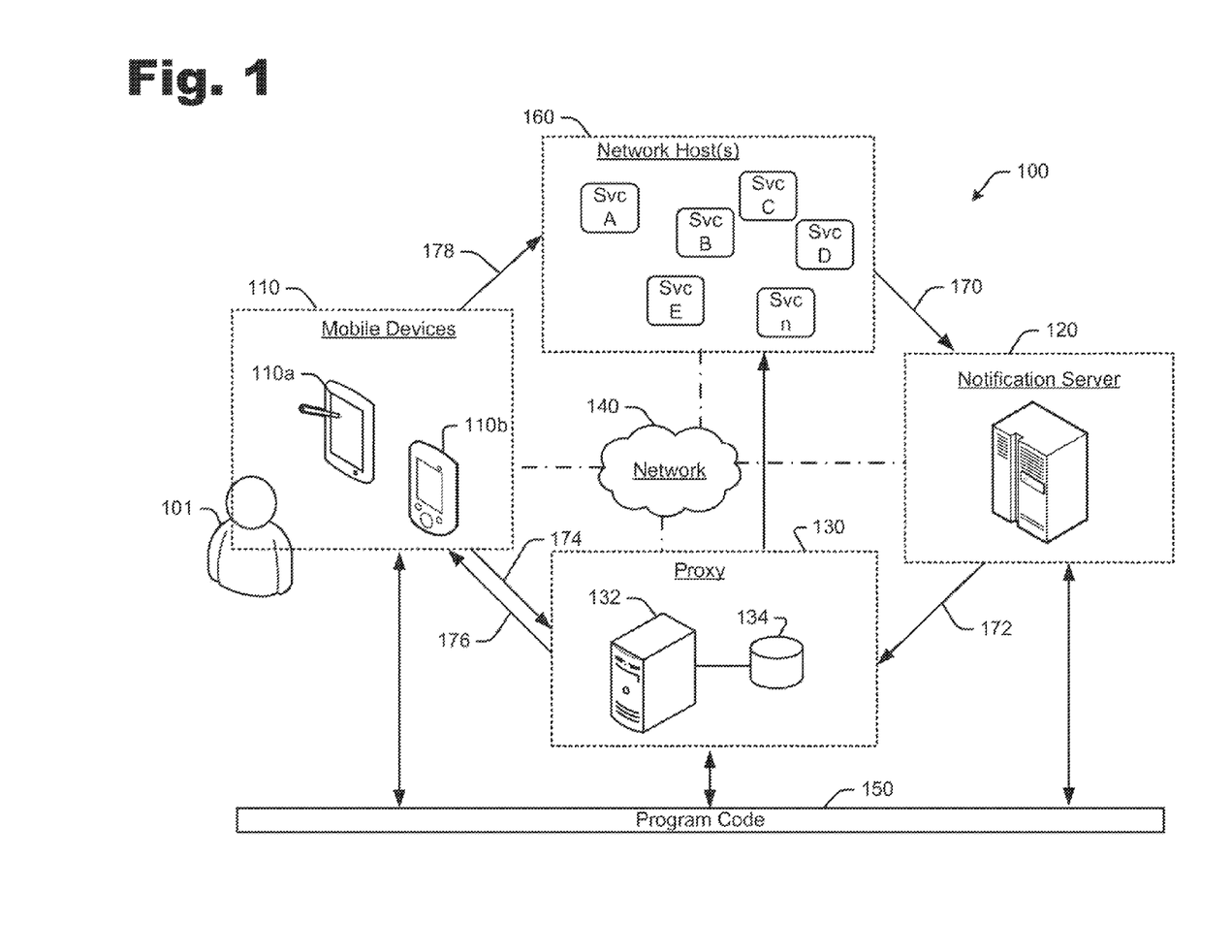
FIG. 1 is a high-level illustration of an example networked computer system which may be implemented for scheduling data in background services.

FIG. 1 is a high-level illustration of an example networked computer system which may be implemented for scheduling data in background services. System 100 may be implemented with any of a wide variety of computing devices, such as, but not limited to, mobile device(s) 110 (e.g., tablets 110a and mobile phones 110b), network server(s) 120, and proxy server(s) 130, to name only a few examples. Each of the computing devices may include memory, storage, and a degree of data processing capability at least sufficient to manage a communications connection either directly with one another or indirectly (e.g., via a network 140). At least one of the computing devices is also configured with sufficient processing capability to execute the program code 150 described herein.

In an example, the system 100 may include a network host(s) 160 providing one or more services (e.g., Services A-D . . . n), which can be accessed by user(s) 101 via the mobile devices 110. For purposes of illustration, the service may be an online data processing service executing on the network host 160 configured as a server computer. Example services may include general purpose computing services (e.g., email), application engines (e.g., social media applications), and hosted business services (e.g., online banking systems, and online retailers), hosted on the Internet or as dynamic data endpoints for any number of client applications or mobile "apps." The services may also include interfaces to application programming interfaces (APIs) and related support infrastructure. It is noted that these network hosts do not have to be owned or managed by the same entity that manages the proxy, nor the same one that manages the notification server.

The services may include at least one remote source of data. In an example, the data is dynamic (i.e., changing over time). In order to provide the user 101 with up-to-date content, the network host 160 may be operable to communicate with the notification server 120. For example, when data changes for a user account maintained by the service (e.g., a new email arrives for the user 101), the network host 160 may issue a notification (e.g., a "push" notification) to the notification server 120.

It is noted that there may be limits to the type or amount of data that may be provided by the service. For example, the owner of the notification platform, which is generally the party that makes the operating system of the mobile device, may impose a limit. For example, notifications may be limited to 4 kilobytes of data. The mobile device has to fetch the rest of the content upon receiving the notification. It is also noted that, the data may include unprocessed or "raw" data, or the data may undergo at least some level of processing.

It is noted that although shown separately in FIG. 1, the notification server 120 may be part of the service, and/or the notification server 120 may be physically distributed in the network and operatively associated with the service. In any implementation, the notification may be issued to the mobile device 110 via the proxy 130, as illustrated by arrow 172. It is also noted that the computing devices described herein are not limited in function. The computing devices may also provide other services in the system 100. For example, host 160 may also process other transactions.

The proxy 130 may be any suitable computer or computing device 132 capable of processing notifications from the notification server 120. In an example, the proxy 130 receives data consumption patterns from the mobile devices 110, as illustrated by arrow 174, and determines sensitivity of data from the service for the mobile device based on the data consumption patterns. The proxy aggregates network access to the data by background services (e.g., apps) executing on the mobile devices 110 according to a schedule based on the sensitivity of the data being provided by the services. For example, the proxy 130 may aggregate notifications from the notification server 120 and issue bundles of notifications to the mobile devices 110 all at the same (or substantially the same) time, as illustrated by arrow 176.

It is noted that in response to the receiving the notification, the user 101 may request additional information from the service, as illustrated by arrow 178. For example, the user 101 may receive a notification for a new email that has arrived. Upon reading the email, the user 101 may click on the attachment. The attachment may not have been sent through to the mobile device 110 with the email, and so the mobile device 110 may fetch the attachment in response to the user clicking on the attachment in the email.

By way of illustration, an example is a notification being too long. If the notification is oversized, the rest of the message may be downloaded when the user clicks on the message, or in the background after the notification is received. In addition, attachments may not be downloaded until the user clicks on them. For example, a 10 KB email may have a 100 KB attachment. The first 4 KB of the email may be sent to the mobile device. The user receives the email, and clicks on the "click here to see the full email" link to download the remaining 6 KB of the email. The user finishes reading the email and clicks on the "download attachment link" to download the remainder of the email.

In an example described in more detail below, the program code 150 may be executed to pre-fetch data associated with a notification from the network host 160. As an illustration, if the user 101 always reads attachments to email, the proxy 130 may pre-fetch any attachments that come through in an email and aggregate the email with the attachment so that the user does not have to make a separate request from the service to access the attachment.

The operations described herein for processing the notification may be executed by program code 150. The program code 150 may reside on or be associated with the proxy 130. It is noted, however, that the program code 150 may also reside, at least in part on the mobile device 110 (e.g., as an app). In an example, the program code 150 has access to both the mobile devices 110 and the proxy 130 in the networked computer system 100. It is also noted that the program code 150 may be executed by a server computer or plurality of server computers.

It is noted that aggregating network traffic by the mobile devices 110 can significantly reduce the ramp and tail energy costs of data communications. While the delay being introduced can be acceptable for many applications, it may be unreasonable for other applications. Determining whether this delay is acceptable or unacceptable depends at least in part on how sensitive each application and/or the user is to a delay. By way of illustration, a user may be less sensitive to delays in receiving social media updates than to emails. At an even finer granularity, a user may be less sensitive to delays in receiving email advertisements, than to delays in receiving emails from an important client or an employee's supervisor. By way of further illustration, an application may be less sensitive to a general software update than to a security update.

Sensitivity to delay may depend on any of a wide variety of considerations. While, sensitivity to delay may depend at least in part on the protocol being used, sensitivity to delay may depend on data consumption patterns and context. For example, a given user may check e-mail more often than usual when waiting for an important e-mail, or a user may answer more quickly to instant messages received from specific people. While taking into account the sensitivity to latency of different applications at a coarse grain based on features such as protocol, port, and transmission rate, the program code 150 described herein may implement an even finer grain of estimating data consumption patterns, e.g., using the user's and/or application behavior and context as additional features.

In an example, characterizing data consumption behavior (e.g., how eager a user 101 is to consume a given piece of information) may include measuring the time between particular data being received by the mobile device 110, and that data being consumed. In an example, time measurement may be implemented using an information flow technique referred to herein as "tainting" or "taint tracking." Tainting, or taint tracking, allows the program code 150 to track flow of given data through the mobile device 110, e.g., up to final delivery to the user 101.

As used herein, the term "time of delivery" means when the data interacts with an application and/or the user 101, including for example, any derivative(s) reaching a destination. For example, data may be considered to reach a destination at a mobile device 110 when the data (or derivative of the data) is output to the user 101 through one of the output interfaces on the mobile device 110. These output interfaces include, but are not limited to, the display screen and other user interface elements, the network, and the speakers.

By "tainting" or marking incoming data as the data is received at the mobile device 110, and monitoring the time it takes for the data to be consumed by the user, it is possible to assign different sensitivities to different data. This time to consumption can be used as an indicator that allows differentiation between pieces of information that are consumed quicker (e.g., immediately received and thus having a higher priority), and that data which is buffered in the mobile device 110, but not actually consumed by the user until some later time when he or she decides to consume the data. Having an accurate understanding of this time, even when the time is an estimate based on prior data consumption patterns, allows the program code 150 to assign sensitivity to incoming data and/or notifications of that data being available, and enables the program code 150 to provide a schedule for efficient information delivery that increases energy savings while providing a good user experience.

Figure 2:
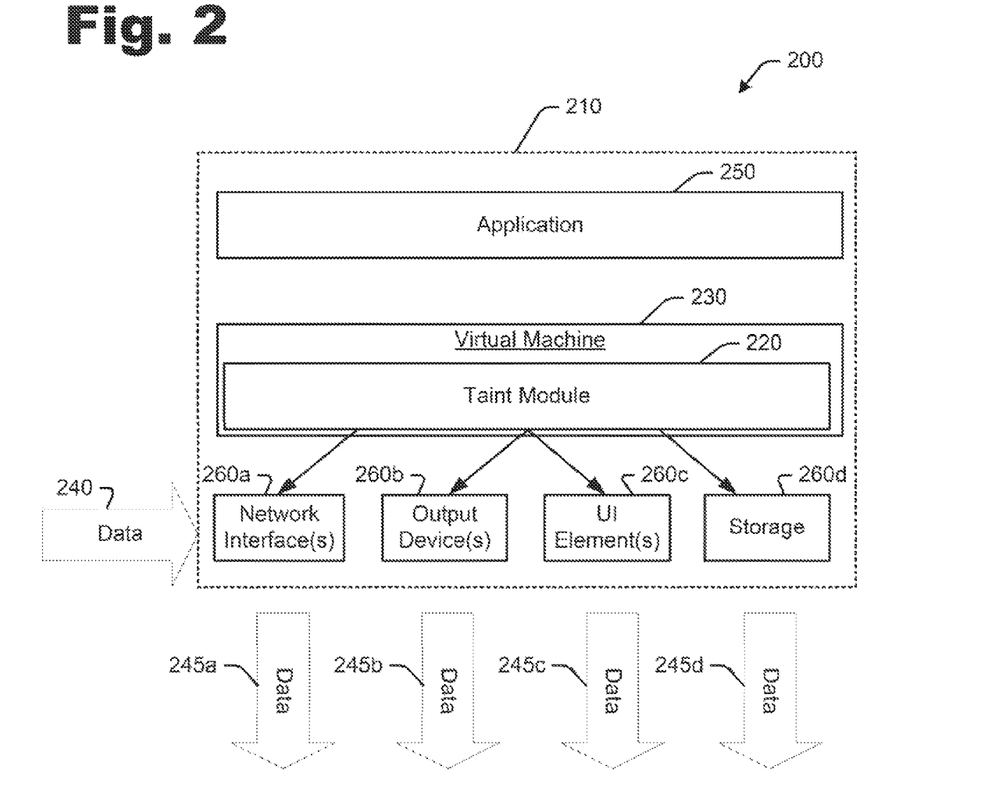
FIG. 2 illustrates an example information flow in a mobile device.

FIG. 2 illustrates an example information flow in a mobile device 200. As mentioned above, the program code may be executed by any suitable computing device to identify access patterns for data received from a remote source. In addition, the program code may be implemented via a proxy that serves more than one mobile device. For purposes of illustration, however, the following examples are described as the program code may be implemented on a so-called "smartphone" 200 running the Android® operating system 210 and using a taint-tracking infrastructure.

In an example, the taint-tracking infrastructure includes a taint module 220 that resides in a virtual machine component 230 of the operating system 210. The taint module 220 can taint incoming data 240 as soon as the network stack at the virtual machine level receives the incoming data 240. The network stack may be as "low" as the bare hardware, on up and including the application passing through the driver layer of the operating system and the virtual machine itself. Once tainted, it is possible to follow the flow of data 240 until the data 240 (or data derived from the incoming data 240) is utilized. For example, the data may be transferred to the network via a network interface 260*a*, delivered via output device 260*b* such as the speakers, and/or utilized (or "consumed") by an application 250 and/or outputting the data (or derivation of the data) to the user through a user interface (UI) element 260*c*, as illustrated by arrows 245*a*-*c* respectively.

The taint module 220 is also able to track data (and/or derived data) that is written to internal storage 260*d* in the mobile device 200. For example, the taint module 220 may taint a target file or a target folder (or other target), so that the taint propagates even if the information is buffered in internal storage for later consumption and/or otherwise processed internal to the mobile device 200 before being consumed, as illustrated by arrow 245*d*.

The taint-tracking infrastructure is shown as an example and is not intended to be limiting. It is noted that other implementations for tracking data in the mobile device are also contemplated as being within the scope of the disclosed systems and methods.

In any event, data tracking may be used to identify data consumption patterns. As introduced above, these patterns may be used to determine a sensitivity of various types of data that may be received at the mobile device 200. Program code may be executed to generate a calendar to aggregate access to the notifications of data and/or the data itself.

An example point of control for background services is in the push notification infrastructure found in the most common mobile operating systems. The push notification infrastructure provides a unified receiver responsible of handling incoming data from many different third-party service providers. In an example, a proxy for the notification infrastructure is implemented in the cloud. The proxy contacts the server side push infrastructure on behalf of the mobile device and enforces the generated schedule.

Figure 3:
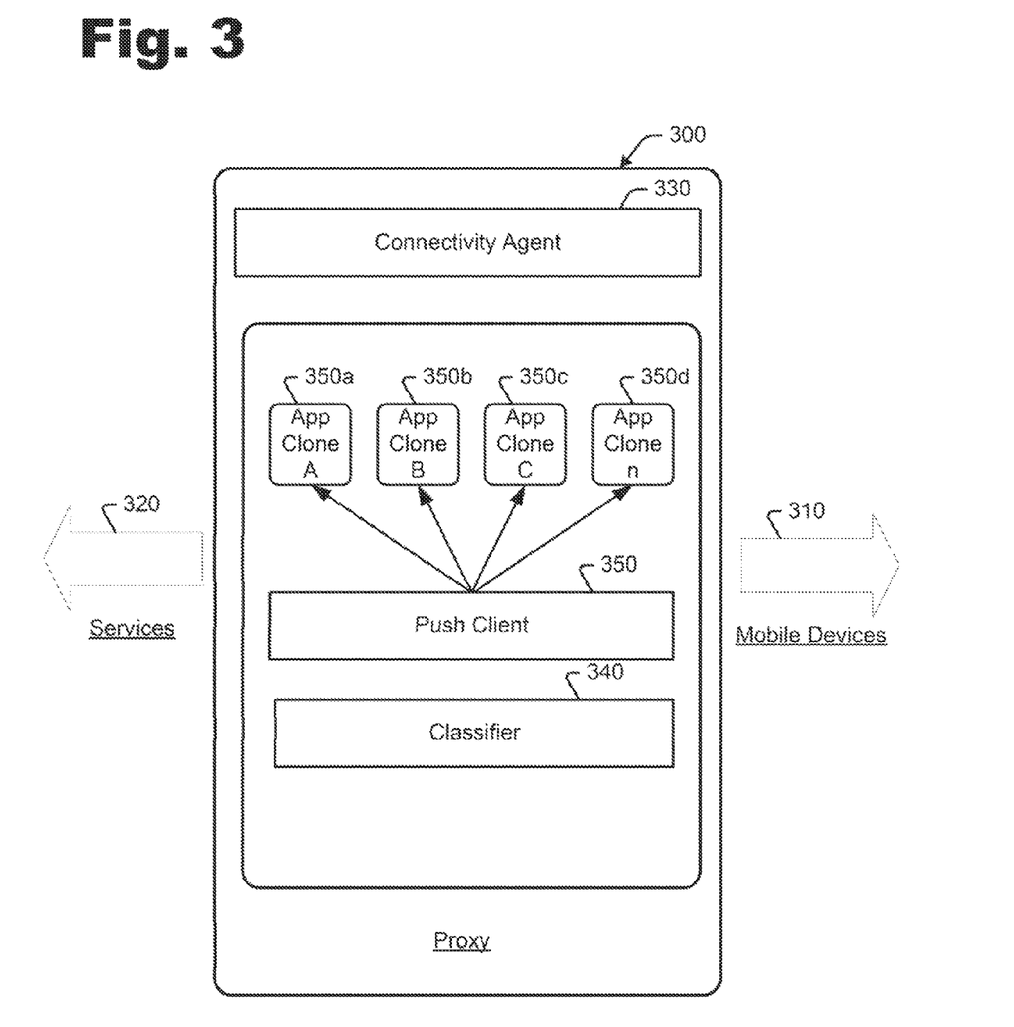
FIG. 3 shows an example data proxy architecture.

FIG. 3 shows an example architecture of machine readable instructions implemented by a data proxy. The proxy 300 may be operatively associated (e.g., via a network) with mobile device(s) 310 and service(s) 320.

In an example, the program code discussed above with reference to FIG. 1 may be implemented in the proxy 300 as machine-readable instructions (such as but not limited to, software or firmware). The machine-readable instructions may be stored on a non-transient computer readable medium and are executable by one or more processor to perform the operations described herein. It is noted, however, that the components are shown only for purposes of illustration of an example operating environment, and are not intended to limit implementation to any particular system and/or program code.

The program code may execute the functions described herein as self-contained modules. These modules can be integrated within a self-standing tool, or may be implemented as agents that run on top of an existing program code. In an example, the architecture of machine readable instructions may include a connectivity agent 330, which monitors connectivity of the mobile devices 310 and services 320. The machine readable instructions may also include a classifier 340, and push client 350.

During operation, the classifier executes with information provided by the mobile device(s) 310 to identify data consumption patterns on a particular mobile device. The classifier further determines sensitivity of data arriving at the mobile device based on the data consumption patterns. The push client 350 uses information provided by the classifier 340 to aggregate network access by background services executing on the mobile device 310 according to a schedule based on the sensitivity of the data arriving at the mobile device.

Accordingly, the proxy 300 may be used to reduce or altogether minimize the energy consumed by the mobile device 310 for data transfers, while still maintaining user-specified tolerances for delays in receiving data. That is, the approach aggregates data to reduce the energy spent in ramp up and tail energy by automatically classifying applications using the user's own tolerance of delay based on information flow control. For example, the protocol uses a scheduling algorithm that minimizes wakeup time and eliminates redundant retransmissions. While the approach delegates a portion of data retrieving to the cloud, instead of saving power only by performing the execution remotely, the systems and methods further save power by reducing the energy spent by the wireless radios.

It is noted that the design of program code allows existing applications to realize the benefits described herein with little to no modification. That is, by running a proxy over the mobile device platform, existing applications only redirect their association from the service push notification infrastructure to the proxy. This example design choice then provides functionality for interception, as opposed to modification. In addition, the approach described above can be implemented in an application agnostic manner. That is, the approach is not dependent on any type of application executing on the mobile device. The approach can also be tailored to the specific behavior of the user without explicit instructions from the user.

The proxy 300 may also implement pre-fetching. In an example of pre-fetching, the proxy 300 analyzes subsequent requests of data following an initial push notification. By analyzing this data, the proxy 300 can identify opportunities to pre-fetch data. For example, on an incoming e-mail notification, the proxy 300 may also run a clone 350a-d of an application, such as an email application to fetch the emails (or attachments to the emails) in advance of notifying the user. In another illustration, the proxy 300 may scan for URLs in an email, and fetch the associated data from the Internet in advance of notifying the user. If the proxy 300 is associated with a personal (or enterprise) server in the cloud with knowledge about the user's connectivity, the proxy 300 can also intelligently push data from the user's server when the mobile device has a suitable connection (e.g., a Wi-Fi connection to the user's server).

It is noted that the proxy 300 is capable of pre-fetching data that is not necessarily rooted at the browser. That is, the proxy 300 does not start prefetching by analyzing browsing behavior, but rather by analyzing tolerance to latency of data from background services.

The proxy 300 analyzes information flow through the mobile device 310, and does not have to rely on protocol information, information payload, or statistical inference of traffic properties. In an example, the proxy 300 may implement a sensitivity classifier to identify consumption patterns and determine sensitivity of data arriving on a mobile device. The proxy 300 can detect priority of each application without explicit feedback from the user, by learning from the actual consumption patterns. For example, feedback that the system receives implicitly from the user can include, but is not limited to, when the user disables audible or vibration alerts about certain elements, the notification consumption time and the content consumption time both increase organically because the device will not output any sound or vibration upon content being received, and the user will take longer to consume the notification. The system may also be used to infer the best user notification settings (when to use a sound alert, and when not to) depending on the latency sensitivity of the content.

Nevertheless, this approach may be implemented orthogonal to other approaches, and may benefit from such additional information.

Figure 4:
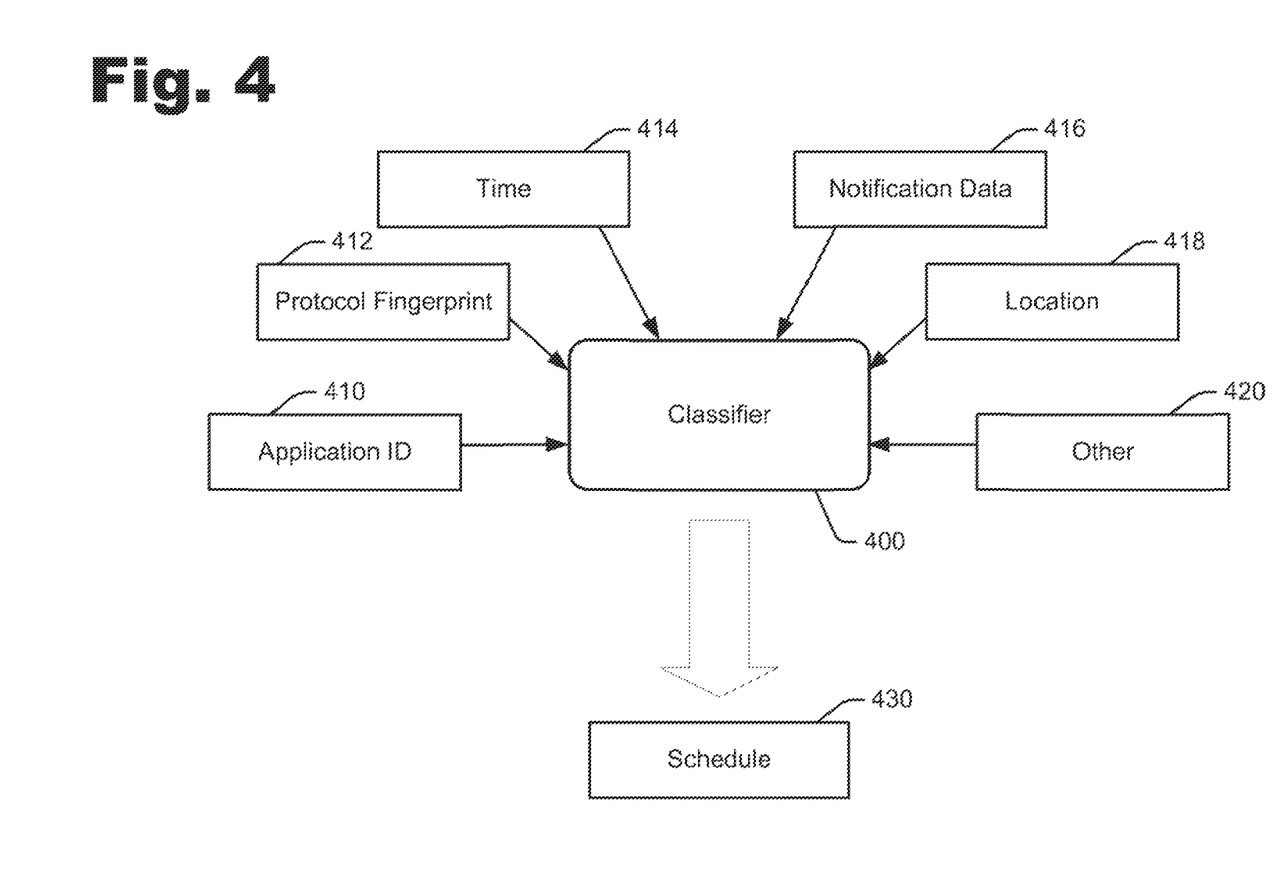
FIG. 4 shows an example latency sensitivity classifier.

FIG. 4 shows an example latency sensitivity classifier 400. The classifier 400 may be implemented in program code and consider a number of data usage factors on the mobile device. For example, the classifier 400 may consider the identification of an application (or application ID 410) consuming the data. The classifier may also consider a protocol fingerprint 412, time 414, notification data 416 (e.g., content of the notification), location 418 and/or any of a variety of other factors 420 related to arrival of the data, content of the data, and/or consumption of the data.

It is noted that the factors described above may be further delimited. For example, timing information that is considered may include a time when the data is consumed by the user and/or time when the data is consumed by the device (e.g., an application), making a clear distinction between the two times.

The classifier may automatically classify data using tolerance to delay by using information flow control. This approach may be implemented in an application agnostic manner, and tailored to the specific behavior of the user without explicit instructions.

The classifier may be used to determine sensitivity of data arriving at the mobile device, which can be used to generate a schedule 430. The schedule may be used to aggregate data, for example, to reduce the energy consumed in ramp up and tail energy. While delegating a portion of data retrieval to the cloud, the primary power savings is not by performing the execution remotely, but rather by aggregating data and thus reducing energy that would otherwise be spent using the wireless radios repeatedly (e.g., for retrieving each notification).

Figure 5:
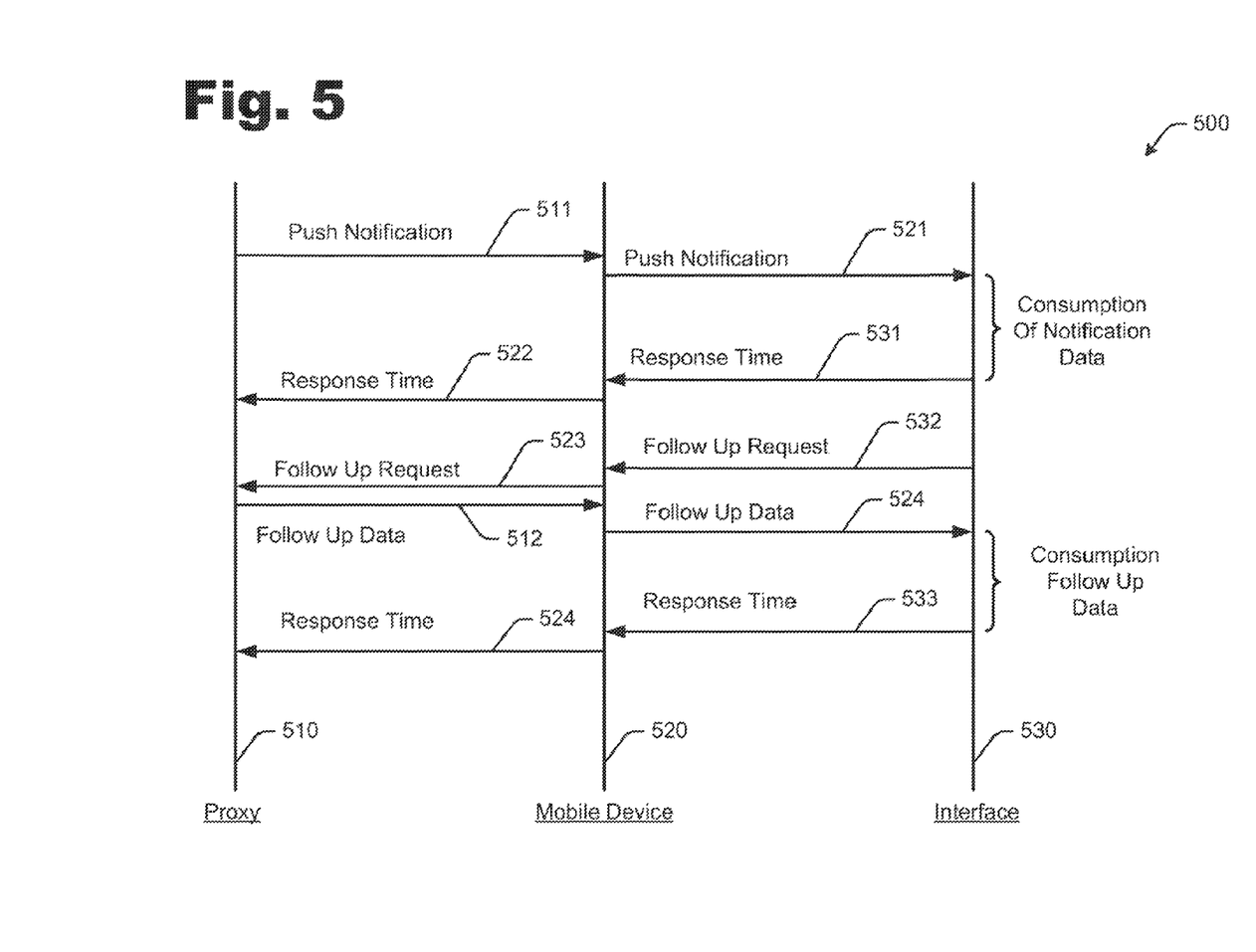
FIG. 5 illustrates an example sequence of events for an application without prefetching.
Figure 6:
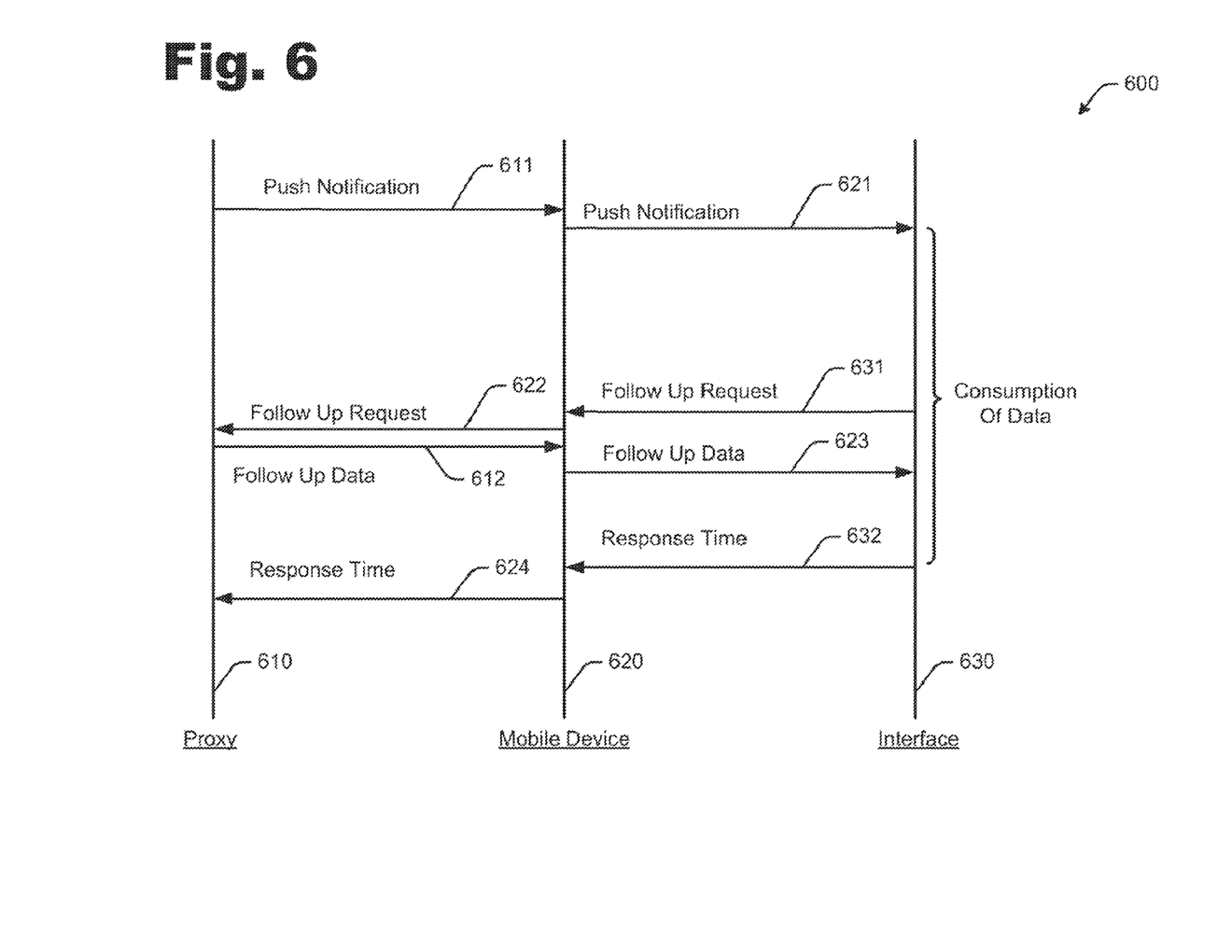
FIG. 6 illustrates an example sequence of events for an application with prefetching.
Figure 7:
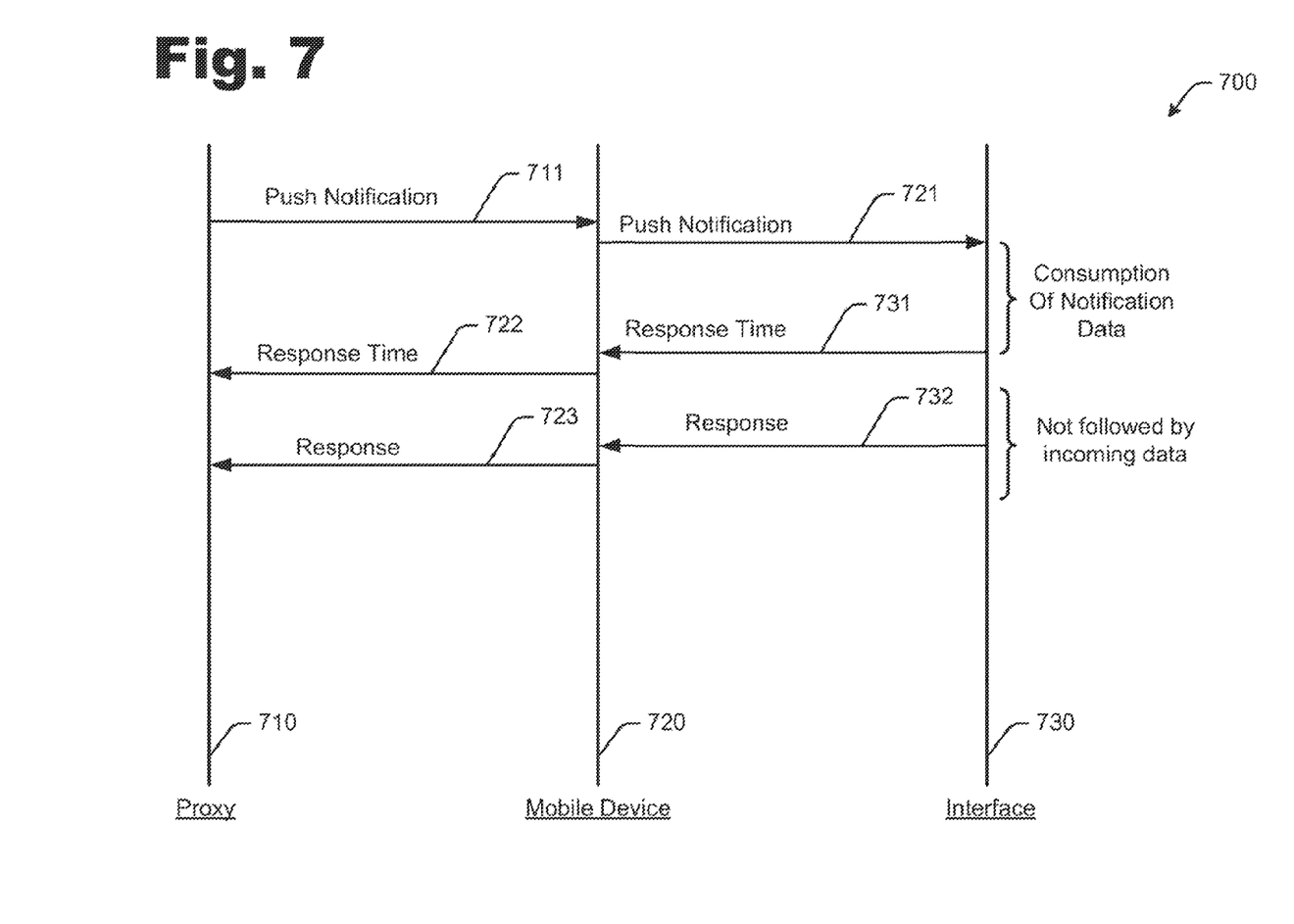
FIG. 7 illustrates an example sequence of events for instant messaging.

Identifying consumption patterns and determining sensitivity of data arriving on a mobile device can be better understood with reference to the following discussion of various example scenarios illustrated in FIGS. 5-7. The following examples illustrate use with a service that uses push notifications to notify a mobile application (or app) on the mobile device that new data is available.

FIG. 5 illustrates an example sequence of events 500 for an application without prefetching. When the service issues a push notification, the proxy 510 acts as an intermediary and issues the push notification 511 to the mobile device 520. Upon receiving the notification at the mobile device 520, the application notifies the user via interface 530 that the new data is available by issuing a push notification 521 (referred to as a "toast" or "toast notification"). Program code on the mobile device 520 measures a response time 531 until the notification is consumed by the user. The mobile device 520 returns the response time 522 to the proxy 510.

Some applications include their entire payload within the notification, while some request additional data from the application server after receiving the notification. The user may also send a follow up request 532 for more data related to the notification, which the mobile device 520 issues 523, either via the proxy 510 or directly to the service. For example, the user may request a status update on a social media site, or an attachment to an email message. The follow-up data 512 is returned to the mobile device 520, and the follow-up data 524 is consumed by the user. Program code on the mobile device 520 measures a response time 533 until the follow-up data is consumed by the user. The mobile device 520 returns the response time 524 to the proxy 510.

These measurements can be used as an indicator of the user's sensitivity to the data of that particular notification. In an example, the proxy 510 can generate a schedule for issuing future push notifications to the mobile device based at least in part on sensitivity of the data. For example, a user may reply faster to email messages from a work email account during working hours, and not at all (or only infrequently) to email messages from a personal email account. But during non-work hours, the user may respond faster to email messages received on their personal email account. Accordingly, the schedule may hold push notifications from the user's personal email account during working hours, only allowing these push notifications to issue to the mobile device during designated times (e.g., the user's lunch break).

These measurements may also be used to identify opportunities to bundle notifications and associated data, in addition to tracking the tolerance of delay for both the notification and the associated data. For example, a user may always open attachments associated with emails from co-workers (e.g., having the same email domain), but rarely open attachments associated with emails from outsiders (e.g., having a different email domain). Accordingly, the schedule may automatically request attachments from the email service upon receiving a push notification that a new email has arrived from a co-worker, and then bundle the push notification, the email and the attachment for sending to the user all at the same time.

FIG. 6 illustrates an example sequence of events 600 for an application with prefetching. This example shows a notification with the associated data fetched before user's reaction. That is, when the service issues a push notification, the proxy 610 acts as an intermediary and issues the push notification 611 to the mobile device 620. Upon receiving the notification at the mobile device 620, the application notifies the user via interface 630, that the new data is available by issuing a toast notification 621. The user sends a follow up request 631 for more data related to the notification, which the mobile device 620 issues 622, either via the proxy 510 or directly to the service. The follow-up data 612 is returned to the mobile device 620, and the follow-up data 623 is consumed by the user. Program code on the mobile device 620 measures a response time 632 until the follow-up data is consumed by the user. The mobile device 620 returns the response time 624 to the proxy 610.

Again, these measurements can be used as an indicator of the user's sensitivity to the data of that particular notification. It is noted that in this example, however, that the time to consumption is given when the user consumes the associated data (not just the push notification). However, the program code is able to distinguish whether the user consumed the data of the notification or the follow up data. This allows the program code to distinguish between the user's reaction time to a notification (e.g., identifying that there are five new emails), and the consumption of a particular actual e-mail (e.g., from the user's supervisor).

FIG. 7 illustrates an example sequence of events for instant messaging. It is understood that this example can also apply to other forms of instant (or substantially instant) consumption of notifications, and instant messaging is used only for purposes of illustration.

FIG. 7 illustrates the scenario where the notification includes the entire application payload, and so no further data requests are received. When the service issues a push notification, the proxy 710 acts as an intermediary and issues the push notification 711 to the mobile device 720. Upon receiving the notification at the mobile device 720, the application notifies the user via interface 730, that the new data is available by issuing a toast notification 721. Program code on the mobile device 720 measures a response time 731 until the notification is consumed by the user. The mobile device 720 returns the response time 722 to the proxy 710.

In this illustration, the response is not followed by incoming data. This is an example case of an application that may never exceed the notification size limit. A message has to have more than a predetermined number (e.g., 4000) of characters to go beyond the limit. For example, the response may have been the user sending a reply instant message. But these measurements can also be used as an indicator of the user's sensitivity to the data of that particular notification. For example, a user may reply faster to instant messages from work colleagues during working hours, and not at all (or only infrequently) to instant messages from friends. But during non-work hours, the user may respond faster to instant messages from friends.

In this scenario, the only consumption time tracked is consumption of the notification. However, it is still possible to track requests derived from the notification payload (e.g., embedded links) and apply prefetching techniques such as those discussed above.

Before continuing, it should be noted that the examples described above are provided for purposes of illustration, and are not intended to be limiting. Other devices and/or device configurations may be utilized to carry out the operations described herein.

Figure 8A:
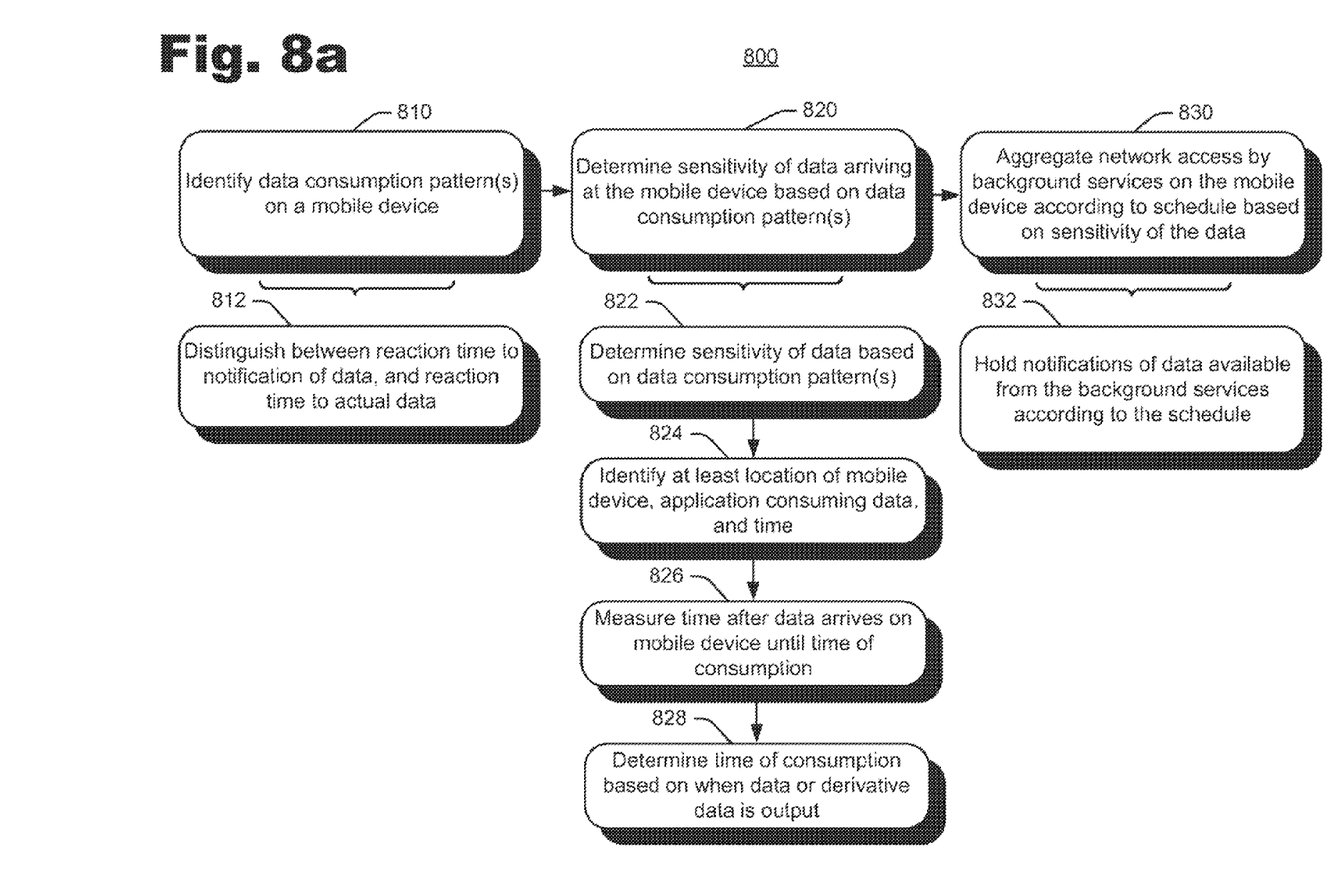
FIGS. 8a-c are flowcharts illustrating example operations which may implement scheduling data in background services.
Figure 8B:
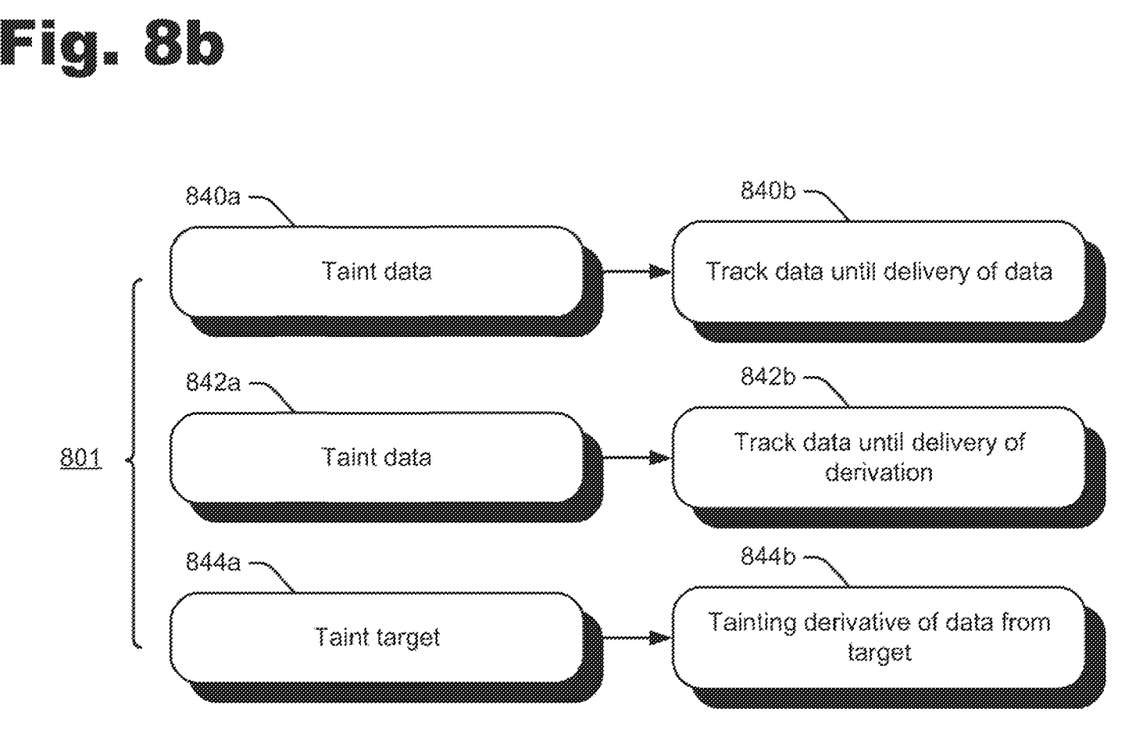
Figure 8C:
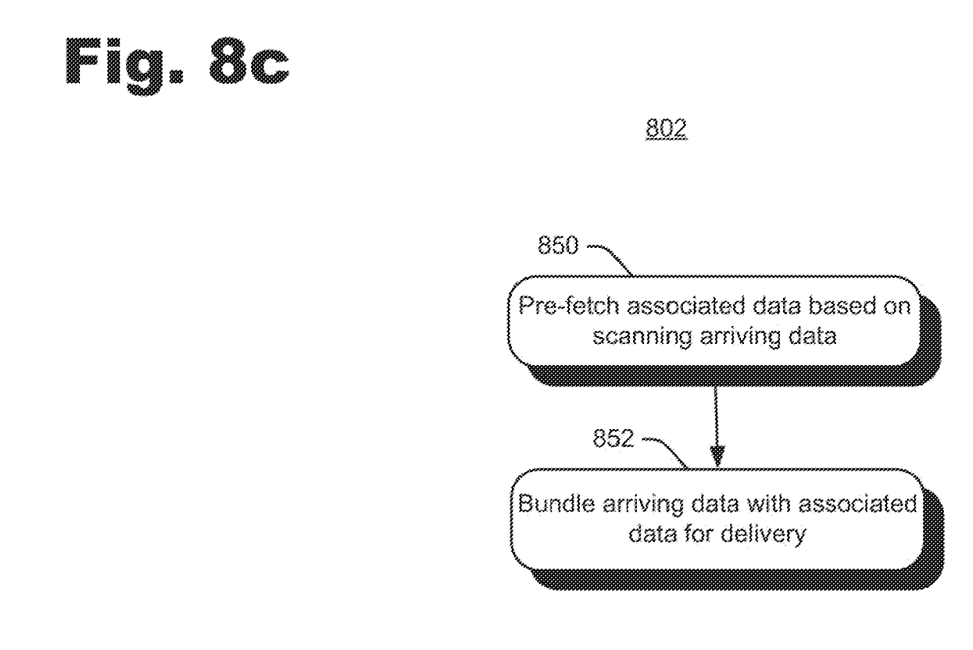

FIGS. 8*a-c* are flowcharts illustrating example operations which may implement scheduling data in background services. Operations 800 (FIG. 8*a*), 801 (FIG. 8*b*), and 802 (FIG. 8*c*) may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

An example of scheduling data in background services on mobile devices includes at operation 810 identifying data consumption patterns on a mobile device. In an example illustration by operation 812, identifying data consumption patterns may include distinguishing between a reaction time of the user to a notification of the data arriving at the mobile device, and reaction time of the user to actual data.

Operation 820 includes determining sensitivity of data arriving at the mobile device based on the data consumption patterns. In an example illustrated by operation 822, determining sensitivity of the data arriving at the mobile device is based at least in part on context of the data. In operation 824, the context of the data includes identifying at least a location of the mobile device, application consuming the data, and time. In another example illustrated by operation 826, determining sensitivity of the data arriving at the mobile device is by measuring the time after the data arrives on the mobile device until time of consumption. In operation 828, the time of consumption is determined based on when the data or a derivative of the data reaches a user via an output interface on the mobile device. It is noted that any of these operations may be used in combination with one another and/or in combination with other operations.

Operation 830 includes aggregating network access by background services on the mobile device according to a schedule based on the sensitivity of the data arriving at the mobile device. Operation 832 may include holding notifications of data available from the background services according to the schedule (e.g., those notifications which are latency-tolerant). As such, aggregating network access retrieves all held notifications at a predetermined time. As such, the mobile device does not have to retrieve notifications separately, and does not incur costs associated with separate retrieval (e.g., separate bandwidth and energy costs).

The operations shown and described herein are provided to illustrate example implementations. It is noted that the operations are not limited to the ordering shown. Still other operations may also be implemented.

In an example shown in FIG. 8*b*, operation 840*a* may include tainting the data arriving at the mobile device, and 840*b* tracking the tainted data until the tainted data is delivered to the user for determining the sensitivity of the data. In another example, operation 842*a* may include tainting the data arriving at the mobile device, and 842b tracking the tainted data until a derivation of the tainted data is delivered to the user for determining the sensitivity of the data. In yet another example, operation 844a may include tainting a target of the data arriving at the mobile device, and 844b tainting a derivative data propagating from the target. Again, it is noted that any of these operations may be used in combination with one another and/or in combination with other operations.

In another example shown in FIG. 8c, operation 850 may include pre-fetching associated data based on scanning the data arriving at the mobile device. Operation 852 may include bundling the data arriving at the mobile device with the associated data for delivery to the user. Accordingly, the mobile device does not have to separately fetch the associated data when later requested by the user.

It is noted that various of the operations described herein may be automated or partially automated. For example, the operations may be implemented at least in part by using an end-user interface (e.g., web-based or "app" interface on the mobile device and/or via the proxy). In this example, the end-user is able to make predetermined selections, and the operations described above are implemented by one or more processor executing program code to present results to a user. The user can then make further selections.

The examples shown and described are provided for purposes of illustration and are not intended to be limiting. Still other examples are also contemplated.

The invention claimed is:

1. A method of scheduling data for background services on mobile devices, comprising:
identifying data consumption patterns on a mobile device;
determining sensitivity to delay of data arriving at the mobile device based on the data consumption patterns, wherein the determining comprises measuring a time after the data arrives on the mobile device until a time of consumption of the data by a user;
aggregating network access by the background services on the mobile device according to a schedule based on the sensitivity to delay of the data arriving at the mobile device;
measuring a time between a notification and a time of consumption of data associated with the notification by the user; and
pre-fetching further associated data together with further notifications based on the measured time between the notification and the time of consumption of data associated with the notification by the user, and bundling the pre-fetched further associated data with the further notifications arriving at the mobile device for delivery to the user.

2. The method of claim 1, further comprising distinguishing between a reaction time of the user to a given notification of the data arriving at the mobile device, and a reaction time of the user to the data referenced by the given notification, for identifying the data consumption patterns.

3. The method of claim 1, further comprising holding notifications of data available for the background services according to the schedule, and wherein aggregating the network access retrieves all held notifications over a network at a predetermined time.

4. The method of claim 1, wherein determining the sensitivity to delay of the data arriving at the mobile device is based at least in part on a context of the data arriving at the mobile device.

5. The method of claim 4, wherein the context of the data arriving at the mobile device is selected from among a location of the mobile device, an application consuming the data, and a time.

6. The method of claim 1, wherein the time of consumption is when the data arriving at the mobile device or a derivative of the data arriving at the mobile device reaches the user via an output interface on the mobile device.

7. The method of claim 1, further comprising tainting the data arriving at the mobile device, and tracking the tainted data until the tainted data is delivered to the user for determining the sensitivity to delay of the data.

8. The method of claim 1, further comprising tainting the data arriving at the mobile device, and tracking the tainted data until a derivation of the tainted data is delivered to the user for determining the sensitivity to delay of the data.

9. The method of claim 1, further comprising tainting a target of the data arriving at the mobile device, and tainting derivative data propagating from the target.

10. A system of scheduling data for background services on mobile devices, the system comprising:
a processor; and
machine readable instructions stored on non-transitory computer-readable media and executable on the processor to:
determine sensitivity to delay of data arriving at the mobile device based on data consumption patterns, the determining comprising measuring a time after the data arrives on the mobile device until a time of consumption of the data by a user;
aggregate network access by background services on the mobile device according to a schedule based on the sensitivity to delay of the data arriving at the mobile device;
measure a time between a notification and a time of consumption of data associated with the notification by the user; and
pre-fetch further associated data together with further notifications based on the measured time between the notification and the time of consumption of data associated with the notification by the user, and bundle the pre-fetched further associated data with the further notifications arriving at the mobile device for delivery to the user.

11. The system of claim 10, wherein the schedule balances energy savings and user experience by reducing ramp energy and tail energy consumption by the mobile device for data transfer.

12. The system of claim 10, wherein the machine readable instructions are further executable on the processor to taint the data arriving at the mobile device to identify the data consumption patterns.

13. The system of claim 10, wherein the machine readable instructions are further executable on the processor to taint a destination of the data arriving at the mobile device to identify the data consumption patterns.

14. The system of claim 10, wherein the machine readable instructions are further executable on the processor to hold notifications of data available for the background services according to the schedule, and wherein aggregating the network access retrieves all held notifications over a network at a predetermined time.

15. The system of claim 10, wherein the machine readable instructions are further executable on the processor to aggregate the network access by aggregating notifications for a selected email account of plural email accounts of the user, based on the sensitivity to delay of the data arriving at the mobile device, wherein the data arriving at the mobile device comprises data directed to the selected email account.

16. A non-transitory storage medium storing instructions that upon execution cause a system to:
   identify data consumption patterns on a mobile device;
   determine sensitivity to delay of data arriving at the mobile device based on the data consumption patterns, wherein the determining comprises measuring a time after the data arrives on the mobile device until a time of consumption of the data by a user;
   aggregate network access by a background service on the mobile device according to a schedule based on the sensitivity to delay of the data arriving at the mobile device;
   measure a time between a notification and a time of consumption of data associated with the notification by the user; and
   pre-fetch further associated data together with further notifications based on the measured time between the notification and the time of consumption of data associated with the notification by the user, and bundle the pre-fetched further associated data with the further notifications arriving at the mobile device for delivery to the user.

17. The non-transitory storage medium of claim 16, wherein the instructions upon execution cause the system to aggregate the network access by aggregating notifications for a selected email account of plural email accounts of the user, based on the sensitivity to delay of the data arriving at the mobile device, wherein the data arriving at the mobile device comprises data directed to the selected email account.

18. The non-transitory storage medium of claim 16, wherein the instructions upon execution cause the system to hold notifications of data available for the background service according to the schedule, and wherein aggregating the network access retrieves all held notifications over a network at a predetermined time.

* * * * *